United States Patent [19]
Lussling et al.

[11] 3,870,746
[45] Mar. 11, 1975

[54] PROCESS FOR RECOVERY OF PURE ACETONITRILE

[75] Inventors: Theodor Lussling; Gerd Schreyer; Ferdinand Theissen, all of Grossauheim; Wolfgang Weigert, Offenbach, all of Germany

[73] Assignee: Deutsche Gold-und Silber-Scheideanstalt vormals Roessler, Frankfurt, Main, Germany

[22] Filed: Jan. 14, 1972

[21] Appl. No.: 217,843

[30] Foreign Application Priority Data
Jan. 22, 1971 Germany............................ 2102886

[52] U.S. Cl................. 260/465.3, 203/14, 203/43, 203/67, 203/69, 203/70, 203/71, 203/DIG. 3, 260/465.1, 260/465.2, 260/465.9
[51] Int. Cl.................. C07c 121/18, C07c 121/32
[58] Field of Search.......... 260/465.1, 465.3, 465.9, 260/465.2; 203/70, 43, DIG. 3, 44, 45, 46, 67, 69, 71, 14

[56] References Cited
UNITED STATES PATENTS

| | | | |
|---|---|---|---|
| 2,463,629 | 3/1949 | Karr................................. | 203/70 X |
| 3,133,957 | 5/1964 | Bellringer....................... | 260/465.9 |
| 3,201,918 | 8/1965 | Sennewald et al............ | 260/465.3 X |
| 3,281,450 | 10/1966 | Horvath.......................... | 260/465.1 |
| 3,451,899 | 1/1969 | Sheely............................. | 203/43 X |

*Primary Examiner*—Joseph P. Brust
*Attorney, Agent, or Firm*—Cushman, Darby & Cushman

[57] ABSTRACT

Pure acetonitrile is recovered from aqueous acetonitrile by extracting with an organic solvent which has little miscibility with water, boils higher than acetonitrile and does not form an azeotrope with acetonitrile. The portion of the extract boiling up to 76°C is distilled off. The remaining acetonitrile containing more difficulty volatile portion is freed from the residual water by addition of an entraining agent and recovering the pure acetonitrile by a fractional distillation.

9 Claims, 1 Drawing Figure

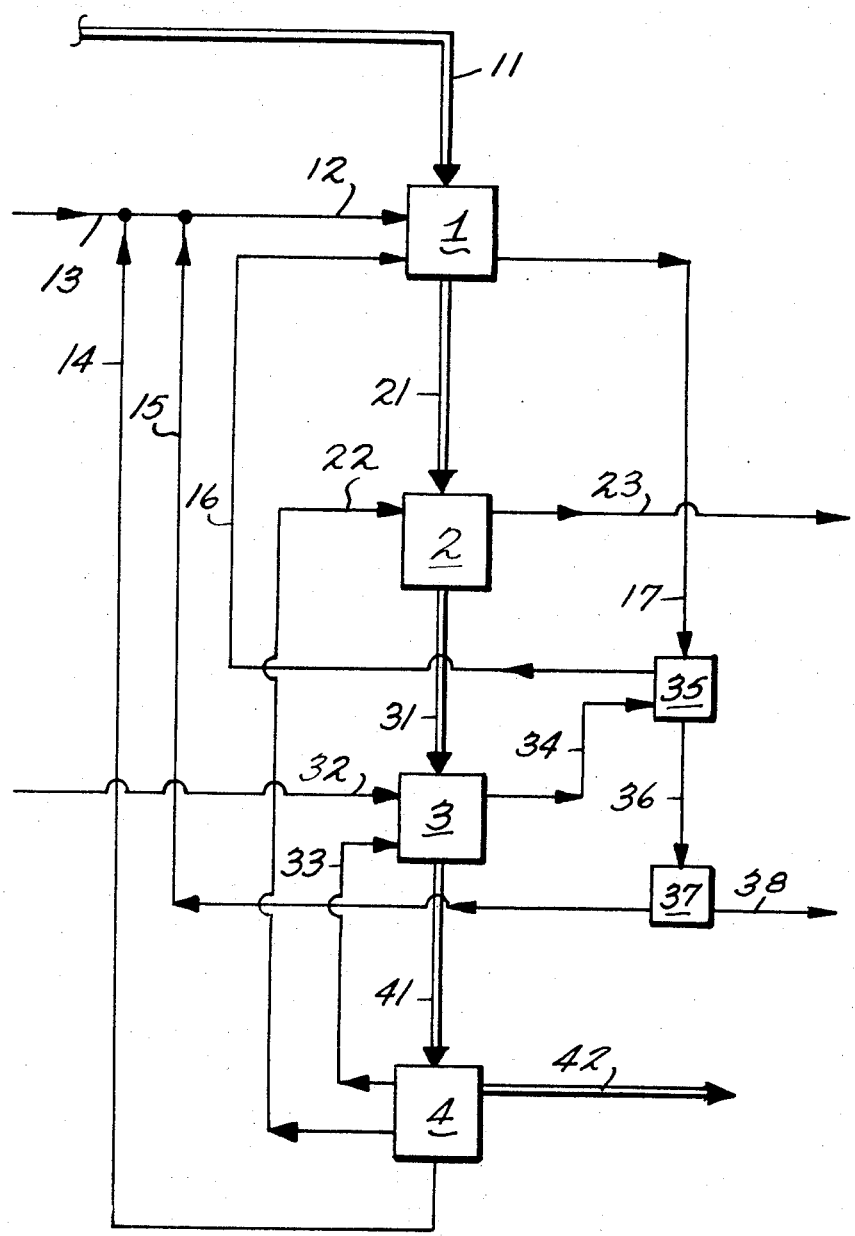

PROCESS FOR RECOVERY OF PURE ACETONITRILE

The invention is concerned with a process for obtaining pure acetonitrile by extraction and distillation from acetonitrile containing aqueous solutions or from materials which contain acetonitrile as a crude or byproduct. The pure acetonitrile is used as an extraction agent in oil and fat chemistry and as a starting material for syntheses, e.g., of malononitrile and naphthyl acetic acid.

Acetonitrile, for example, accumulates in considerable amounts as a byproduct in the reaction of propylene with ammonia and oxygen to form acrylonitrile. The acetonitrile together with other compounds particularly such as hydrogen cyanide, acetone, propionitrile, benzonitrile, acetaldehyde, acrolein, methanol and cyanhydrin is separated from the reaction mixture in an aqueous extract. It is not possible to recover a pure and water-free acetonitrile from such mixtures by merely distilling on account of the presence of azeotropic mixtures.

It is known to separate water from acetonitrile by means of activated alumina or an extraction and distillation using xylene (U.S. Pat. Nos. 2,560,931 and 3,281,450). By treatment with alkali hydroxide and a distillation acrylonitrile and water are separated from acetonitrile (French Pat. No. 1,431,919) and by an additional treatment with iron sulfate, there is also removed hydrogen cyanide. (U.S. Pat. No. 3,201,451). Unsaturated nitriles are separated by a Diels-Alder reaction with dienes. (German Offenlegungsschrift No. 1,593,471). By these processes only a partial purification of the acetonitrile from water or the other compounds is obtained. Furthermore, some processes are expensive because of the consumption of a chemical assistants.

Also known is a process for the recovery of both pure and water-free acetonitrile. According to this process, the acetonitrile is freed from hydrogen cyanide and other easily volatile constituents by a distillation. Because of the addition of benzene, the entire amount of water is thereby distilled off as a ternary mixture of acetonitrile-benzene-water. The distillate is treated with alkali hydroxide, e.g., sodium hydroxide and ferrous sulfate. The acetonitrile remaining as a residue of the distillation along with more difficulty volatile constituents is purified by a further distillation (German Offenlegungsschrift No. 1,568,212). These processes require a high expenditure of energy since the entire amount of water is removed by distillation. The yield of acetonitrile only amounts to 76 percent.

A process has now been found for the recovery of pure acetonitrile from acetonitrile containing aqueous solutions by extraction and distillation that is characterized by the following steps:

1. The acetonitrile is extracted from the aqueous solution with organic solvents which have a higher boiling point than acetonitrile, have little miscibility with water, and do not form an azeotrope with acetonitrile;
2. The volatile constituents of the extract having a boiling point up to 76°C are distilled off;
3. The remaining less volatile components which contain acetonitrile are freed of residual water by distillation with addition of an entraining agent, and;
4. The pure acetonitrile is recovered by a fractional distillation.

According to the process of the invention beginning with an aqueous solution, a pure and water free (anhydrous) acetonitrile is obtained with very little loss and with only a small expenditure of energy. Surprisingly, it is possible to separate the main portion of the water by an extraction (1) so that only a small residual amount of water must be removed by the distillation (3) Besides the solvents which are recycled, it is not necessary to use chemical assistants.

The process of the invention is especially suited for the recovery of pure acetonitrile from the aqueous extract which results in the customary working up of the reaction mixture in the production of acrylonitrile by reaction of propylene with ammonia and oxygen. The aqueous solution can have any dilution, more suitably, however, it should be concentrated as much as possible and generally contains 40 to 60 percent, in a given case up to 70 percent, acetonitrile by weight, up to 5 percent more difficultly volatile nitriles such as propionitrile and benzonitrile, up to 10 percent hydrogen cyanide and smaller amounts of other compounds such as acetone, acrylonitrile, acetaldehyde, acrolein, methanol and cyanhydrin can be employed directly as the starting solution for the process of the present invention.

The use of the process, however, is not limited to the recovery of acetonitrile resulting from the production of acrylonitrile. Aqueous acetonitrile solutions of other sources and varying compositions which exist as aqueous solutions or extracts from other materials containing acetonitrile as the crude or byproduct, for example, the reaction mixture resulting from the dehydration of acetamide, can also be used. The solutions fundamentally can contain any impurities so long as these behave indifferently or can be removed directly in the first step of the process. In case it is necessary, an extraction or distillation can be provided as additional process steps.

In the first process step (1) the acetonitrile is extracted from the aqueous solution. As the extracting agent, all solvents can be used which dissolve acetonitrile well, on the other hand, are only slightly miscible with water, have a higher boiling point than acetonitrile, but which do not form an azeotropic mixture with acetonitrile and, besides, are inert. For example, suitable compounds include substituted benzenes which in one or several side chains have a total of at least 3 up to about 20 carbon atoms such as diethylbenzene, e.g., 1,3-diethylbenzene, 1,4-diethylbenzene, methyl propyl benzene, e.g., 1,4-methyl propyl benzene, cymene, 1,3,5-triethyl benzene, dodecylbenzene, butylbenzene, t-butylbenzene, cumene. Especially preferred are tri- and tetramethyl benzene or alkylbenzene fractions with 3 to 4 carbon atoms in the side chain, e.g., prehnitene, isodurene, mesitylene. Also suitable, for example, are benzonitrile and alkyl substituted benzonitriles, e.g., o-toluonitrile and m-toluontrile. The solvents can also be used as mixture.

The proportions of extraction agent to aqueous solution are dependent upon the type of extraction agent and the concentration of the acetonitrile and the other compounds in the aqueous solution. Generally the volume ratios employed of aqueous solution to solvent range from 1.0:0.3 to 1.0:4.0. In case of the presence of an extract from the reaction mixture in the production of acrylonitrile and the use of the tri and tetramethyl benzenes, the preferred volume ratio is from 1.0:0.6 to 1.0:1.2.

In the case where the starting solution is not an aqueous solution but a solution in which organic liquids, provided as extraction agents, are present, they can be subjected directly to the process. If necessary, however, a washing with water is provided as the first process step.

In the extraction (1), in addition to the acetonitrile, considerable portions of the other compounds are obtained in the extract. In the subsequent distillation (2) that portion which is volatile at a boiling temperature up to 76°C is distilled off. In the case of working up an extract recovered from the production of acrylonitrile, this portion contains compounds such as hydrogen cyanide, acetone, acrylonitrile, acetaldehyde, acrolein and methanol. Small amounts of acetonitrile and water also pass over.

In the next process step (3), an entraining agent for water is added to the solution remaining after the distillation (2). As entraining agent, there can be used organic solvents which form azeotropes with water or with acetonitrile and water but, for the rest, behave indifferently. For example, it is suitable to use alkanes such as n-pentane, n-hexane, or n-heptane, or cycloalkanes such as cyclohexane or methyl cyclohexane, chlorinated hydrocarbons such as chloroform or carbon tetrachcloride and aromatic hydrocarbons such as benzene. In a given case, mixtures of these hydrocarbons or chlorohydrocarbons are added. Preferably benzene is used.

The entraining agent is suitably added only in the minimum amount in which it is required for distilling off the water. In the case where benzene is used as the entraining agent, the water passes over as a ternary mixture of acetonitrile-benzene-water at 64° to 65°C. In the condensation of the distillate there results, by phase separation, a separation of the water from the acetonitrile and benzene which, suitably, are returned to the distillation. The entraining agent in this case is used in the amount which is required for the maintenance of the ternary azeotrope in the vapor phase.

In the last process step (4), a fractional distillation takes place. First at a temperature of up to about 81°C, the entraining agent in a given case reaching this step, is separated off. In the case where benzene is used, it is removed as the binary azeotropic mixture acetonitrile - benzene. Between 81° and 82°C, there is obtained pure acetonitrile, especially between 81.2° and 81.6°C. As the distillation residue, there remains the extraction agent added at (1) and other more difficultly volatile compounds, especially nitriles, within a given case, small amounts of decomposition products of nitriles and cyanhydrins.

The invention will be understood best in connection with the attached drawing, which shows a preferable arrangement, wherein the single FIGURE is a schematic diagram of the process.

This type of process is recommended preferably with the addition of alkylbenzene fractions having 3 to 4 carbon atoms in the side chains as the extraction agent and benzene as the entrainer with the reaction mixture of the aqeuous solution recovered from the production of acrylonitrile. The individual process steps can occur either discontinuously or continuously.

Referring more specifically to the drawings, in the extraction unit the aqueous solution containing acetonitrile in conduit 11 is brought together with the extraction agent in conduit 12. The predominant portion of the extraction agent conveyed in the circuit 14 is that which is recovered in the distillation unit 4. A smaller portion in conduit 15 arises from the water separation unit 37 and a further smaller portion is introduced as fresh extraction agent in conduit 13. Distillate in Line 16, consisting essentially of acetonitrile, is fed into the extraction unit 1 from distillation unit 35. After carrying out the extraction, the aqueous phase goes via conduit 17 into the distillation unit 35 and the organic phase goes via conduit 21 into the distillation unit 2.

In the distillation unit 2, the solution components which boil up to about 76°C are distilled off through conduit 23.

The distillation residue from distillation unit 2 goes via conduit 31 to distillation unit 3 where it is treated, if necessary, with a small amount of fresh entraining agent from conduit 32 and, in a given case, with further entraining agent via conduit 33 from distillation unit 4. Water is distilled off through conduit 34 with the help of the entraining agent and the aqueous phase collected as distillate is lead to the distillation unit 35, together with the aqueous phase in conduit 17 from extraction unit 1. In this distillation, there is recovered distillate in conduit 16 consisting essentially of acetonitrile and this is being returned to extraction unit 1. The distillation residue from 35 goes via conduit 36 into water separator 37 in which the waste water is separated from the residual organic phase. The waste water leaves via conduit 38, while the organic phase, which consists essentially of the extraction agent, is returned via conduit 15 to the extraction unit 1.

The distillation residue from unit 3 in conduit 41 is subjected to a fractional distillation in unit 4. In discontinuous operation, in a given case in continuous operation as well, the distillation residue passing via conduit 41 to unit 4 contains part of the entraining agent. This is first distilled off and is returned to unit 3 via conduit 33. As the next fraction, pure acetonitrile is recovered through conduit 42. A smaller residue of impure acetonitrile which results is led via conduit 22 into distillation unit 2. The extraction agent remaining as a distillation residue in conduit 14, if necessary after washing with water, is united with the partial streams in conduits 13, 15 and 16 and returned to the extraction unit 1.

In the following example, the numbers given in parentheses are those designated in the drawings.

Unless otherwise indicated, all parts and percentages are by weight.

EXAMPLE

The process was carried out repeatedly according to the method given in the drawing until a stationary relation occurred. The following data are directed to this stable condition.

As starting material, there was used an aqueous extract of a reaction mixture resulting from the production of acrylonitrile. 208.50 kg of this solution were used. It contained 108.30 kg of acetonitrile, 89.00 kg of water, 6.30 kg hydrogen cyanide and 4.90 kg of other compounds, besides such higher boiling points chiefly acetaldehyde, acetone, acrolein, acrylonitrile, propionitrile and methanol. To the solution, there were added 27.15 grams of distillate from 35 containing 21.00 kg. of acetonitrile and for the remainder, water and trifling amounts of other compounds. This mixture was extracted with a total of 176.99 kg of extraction agent. The extraction was carried out four times in succession with about one fourth of the extraction agent being used each time. As extraction agent, there was employed a hydrocarbon mixture consisting essentially of alkylbenzenes with chiefly 4 carbon atoms in the side chains and having a boiling range between 187° and 213°C. There was employed a mixture of 4.79 kg fresh extraction agent, 1.20 kg of organic phase originating in 37 and 171.00 kg of distillation residue washed with water from 4.

In the extraction unit 1, there appeared 304.34 kg of the organic phase (upper phase), containing 108.30 kg of acetonitrile. This extract was led to the distillation unit 2 and mixed here with the 6.70 kg of distillate 22 recovered in the after distillation of the more difficulty volatile portion in 4 which contained 6.55 kg of acetonitrile. The mixture was fractionally distilled. First, there was distilled off at a temperature of 26°C at the top of the column 3.46 kg of almost pure hydrogen cyanide. It was recovered by condensation. By further distillation up to 76°C head temperature there came over 7.15 kg of acetonitrile mixed with 4.22 kg of other compounds such as water, acetone, hydrogen cyanide, acrolein, acrylic acid, acetaldehyde and methanol. This portion was burned.

The distillation residue was treated with 0.37 kg of benzene and with the mixture 33 recovered as forerunners from 4. It was essentially a binary mixture of acetonitrile-benzene, which was composed of 14.97 kg of acetonitrile and 4.76 kg of other materials, chiefly benzene. In the distillation unit 3, there was distilled a ternary mixture acetonitrile-benzene-water at 64° to 65°C, which upon condensation resulted in a 14.60 kg aqueous phase 34 containing 1.69 kg of acetonitrile.

The aqueous phase 34 was united with the aqueous phase 17 from the extraction unit 1 and was subjected to a fractional distillation in unit 35. The portion distilling off at the head of the column, at a temperature of up to 93°C, 27.15 kg containing 21.00 kg of acetonitrile, served as the already mentioned additive 16 in the extraction in unit 1. The distillation residue 36 was led to a water separator 37. From this, the water phase, 94.55 kg was withdrawn 38; the organic phase, 1.20 kg serves as the also already mentioned additive 15 in the extraction unit 1.

The water free residue remaining in distillation unit 3 was further fractionally distilled in unit 4. First there passed over, at a head temperature up to 81.2°C, 19.73 kg of a distillate containing the entire residual benzene 33. It served as the already mentioned additive in the distillation unit 3. In the further distillation, there was obtained at 81.2° to 81.6°C, 100.00 kg of acetonitrile. By lowering the head temperature, a further 6.70 kg containing 6.55 kg of acetonitrile were recovered 22. This was impure because of the thermal splitting of cyanhydrins with hydrogen cyanide. It served as an already mentioned additive in the distillation unit 2.

The residue from the distillation unit 4, which consists of the extraction agent, and contains impurities from the difficulty volatile compounds was extracted with 71.00 kg of water. The aqueous phase, 75.28 kg, was withdrawn 42, the organic phase 14 serves, as already mentioned, as the extraction agent in the extraction unit 1.

The acetonitrile recovered was 99.6 percent pure. The remaining impurities were essentially propionitrile and benzene.

What is claimed is:

1. In a process for the recovery of pure acetonitrile from an aqueous solution of acetonitrile containing organic impurities boiling below and above acetonitrile, said aqueous solution of acetonitrile having been obtained as byproduct in the reaction of propylene with ammonia and oxygen to form acrylonitrile, the improvement comprising:
   1. extracting the aqueous solution of acetonitrile with an organic solvent extraction agent which has a higher boiling point than acetonitrile, is only slightly miscible with water, and does not form an azeotropic mixture with acetonitrile, said extraction agent being an alkyl substituted benzene having a total of 3 to 20 carbon atoms in the alkyl group or groups, benzonitrile or toluonitrile;
   2. distilling off the portion volatile up to about 76°C. from this extract;
   3. freeing the acetonitrile containing more difficulty volatile residue from water by distillation in the presence of a water entraining agent; and
   4. recovering the pure acetonitrile by a fractional distillation.

2. A process according to claim 1 wherein the extraction agent is trimethyl benzene, tetramethyl benzene or an alkylbenzene fraction having a total of 3 to 4 carbon atoms in the alkyl side chains.

3. A process according to claim 2 wherein the entraining agent is benzene.

4. A process according to claim 1 wherein the entraining agent is a liquid alkane, cycloalkane, chlorinated hydrocarbon or aromatic hydrocarbon.

5. A process according to claim 1 wherein the volume ratio of aqueous solution to extraction agent in step (1) is from 1.0:0.3 to 1.0:4.0.

6. A process according to claim 5 wherein the extraction agent is trimethyl benzene or tetramethyl benzene and the volume ratio in step (1) is from 1:0.6 to 1.0:1.2.

7. A process according to claim 1 wherein the concentration of acetonitrile in the aqueous solution is 40 to 70 percent by weight.

8. A process according to claim 1 wherein the extraction agent is an alkyl substituted benzene having a total of 3 to 20 carbon atoms in the alkyl group or groups.

9. A process according to claim 1 wherein the extraction agent is benzonitrile or toluonitrile.

* * * * *